United States Patent [19]

Hawkins

[11] 4,209,659
[45] Jun. 24, 1980

[54] VIBRATION DAMPER FOR OVERHEAD CONDUCTORS

[75] Inventor: Ronald G. Hawkins, Massena, N.Y.

[73] Assignee: Aluminum Company of America, Pittsburgh, Pa.

[21] Appl. No.: 12,340

[22] Filed: Feb. 15, 1979

[51] Int. Cl.² ............................................. H02G 7/14
[52] U.S. Cl. ..................................................... 174/42
[58] Field of Search ......................................... 174/42

[56] References Cited

U.S. PATENT DOCUMENTS

| Re. 26,602 | 6/1969 | Taylor | 174/42 |
| 1,766,995 | 6/1930 | Hofmann | 174/42 |
| 2,132,319 | 10/1938 | Preiswerk | 174/42 |
| 3,780,207 | 12/1973 | Crosby et al. | 174/42 |
| 4,110,553 | 8/1978 | Hawkins et al. | 174/42 |

*Primary Examiner*—Laramie E. Askin
*Attorney, Agent, or Firm*—Elroy Strickland

[57] ABSTRACT

A device for damping aeolian vibrations in a single overhead conductor. The device includes an inertial weight suspended from three or more separate resilient members equally and radially spaced in a plane perpendicular to a vertical axis passing through the center of the weight, and a conductor clamping means which also provides support means for said radially disposed resilient members.

7 Claims, 7 Drawing Figures

PERFORMANCE COMPARISON OF STOCKBRIDGE DAMPER
AND RADIAL OPPOSED SPRING DAMPER 4,209,659

VIBRATION DAMPER FOR OVERHEAD CONDUCTORS

BACKGROUND OF THE INVENTION (1) Field of the Invention

This invention relates to vibration dampers for use on cables suspended overhead and in particular to overhead electrical transmission cables.

(2) Description of Prior Art

Electrical transmission cables suspended overhead from towers are subject to a wind induced vibration identified as aeolian vibration. Any particular resonant vibration that may occur in an overhead conductor span is a function of a number of variables, among which are wind velocity and conductor tension. A typical overhead conductor for high voltage transmission of electrical power is comprised of a multi-strand conductor. The greater the tension on such a conductor, the less is the cost thereof since there is less sag and a consequent saving in material. The greater the tension, however, the greater is the propensity of the conductor to vibrate from the wind, and the less is the natural damping effect of the conductor itself because of lesser interstrand friction between the individual strands comprising the conductor. Even though the amplitude or intensity of aeolian vibration is small (rarely more than the diameter of the conductor when measured from peak to peak), the effect of such a vibration is to cause the conductor strands to fail in fatigue. One method of combating aeolian vibration is by the use of damping devices, an early one being the well-known Stockbridge damper. The Stockbridge damper is comprised of a symmetrical arrangement of weights and messenger cable clamped to the conductor. The function of the Stockbridge damper is to transform the vibratory motion of the conductor into another form of energy, namely, heat from friction between the strands of the messenger cable, and dissipate said heat to the atmosphere. Since the first Stockbridge damper, a vast number of damper devices have been developed in an attempt to effectively perform over a broad range of vibratory frequencies and other variables such as weather conditions. In most prior devices, the vibratory motion is transformed into heat either by friction, impact or a combination of the two. For example, U.S. Pat. No. 2,132,319 to Preiswerk discloses a damper comprised of a weight resiliently connected to a conductor, and damping is achieved by impacting the weight against stops mounted in fixed relation to the conductor.

Another U.S. Pat. No. (Re. 26,602) to Taylor teaches a damper comprising a weight connected by a flexible coupling to a support carried by the conductor, and vibratory motion of the conductor imparts a helical motion to the weight through flexible couplings, and energy is dissipated through flexing of ribs in the coupling.

U.S. Pat. No. 3,614,291 to Pullen discloses a damper which dissipates energy through a fluid containing dashpot.

Hawkins et al U.S. Pat. No. 4,110,553, issued Aug. 29, 1978, discloses a damper that utilizes friction of adjacent coils of a closely wound helical spring or springs to dissipate vibratory motion from an overhead conductor.

The aforementioned dampers are but a few of the many approaches in the art of damping vibratory cable motion.

BRIEF SUMMARY OF THE INVENTION

The present invention comprises a damping assembly in which an inertial weight is suspended from three or more separate resilient members equally and radially spaced about a vertical axis that is perpendicular to the conductor and passing through the center of the weight, and a cable clamping means which is part of and supports the assembly on an overhead conductor.

It is an object of this invention to provide effective and high efficiency damping over a broad range of aeolian vibrations induced in overhead conductors by air currents moving across the conductors.

Another object of this invention is to provide a damper with resilient means protected from detrimental effects of the environment.

A further object of this invention is to provide a damper that is easily assembled.

An advantage of this invention is improved resistance to high voltage corona discharge because of the invention's compact size and the generally curved shape of the inertial weight.

Another advantage of this invention is the inertial weight self-centering feature which provides for material and assembly savings as well as improved damping performance over other spring friction dampers.

BRIEF DESCRIPTION OF THE DRAWINGS

The above and other objects and advantages of the invention will be more fully understood and appreciated with reference to the following description and drawings appended thereto in which.

DESCRIPTION OF A PREFERRED EMBODIMENT

The resilient members in an embodiment of this invention can be made of either shaped elastomer material or close-wound helical metal or elastomer springs. In general, elastomers will yield better damping for low frequency conductor vibration and metal close-wound helical springs are superior for high frequency vibration. A preferred embodiment of a device of this invention using helical metal springs will first be described followed by a description of a preferred embodiment using elastomer shapes.

Figure 1:
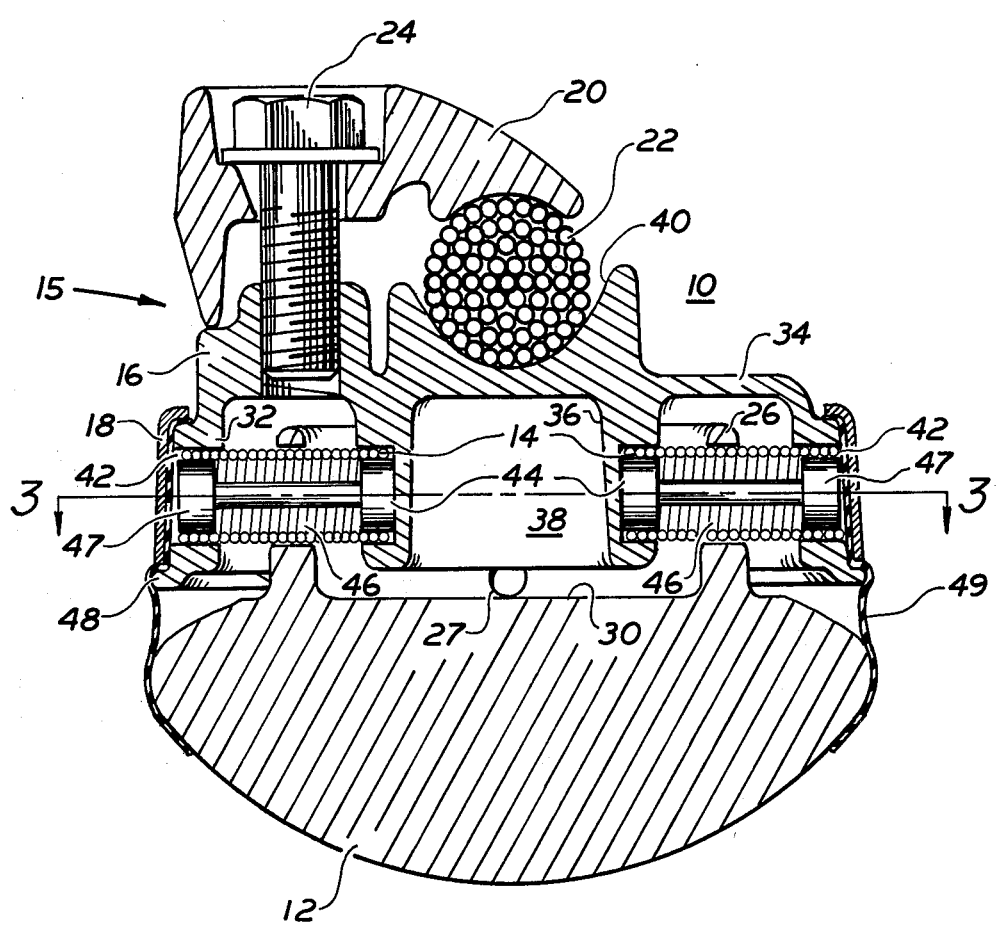
FIG. 1 is a vertical sectional view of the damper of the invention clamped on an overhead cable.
Figure 2:
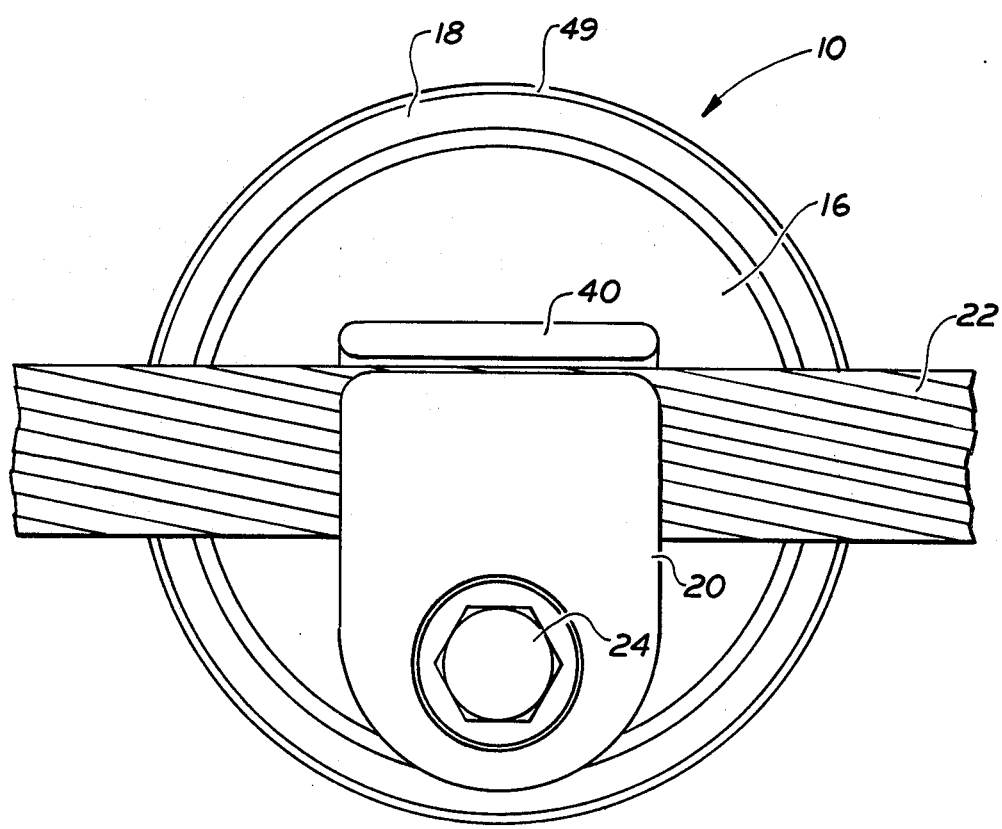
FIG. 2 is a top plan view of the damper.
Figure 3:
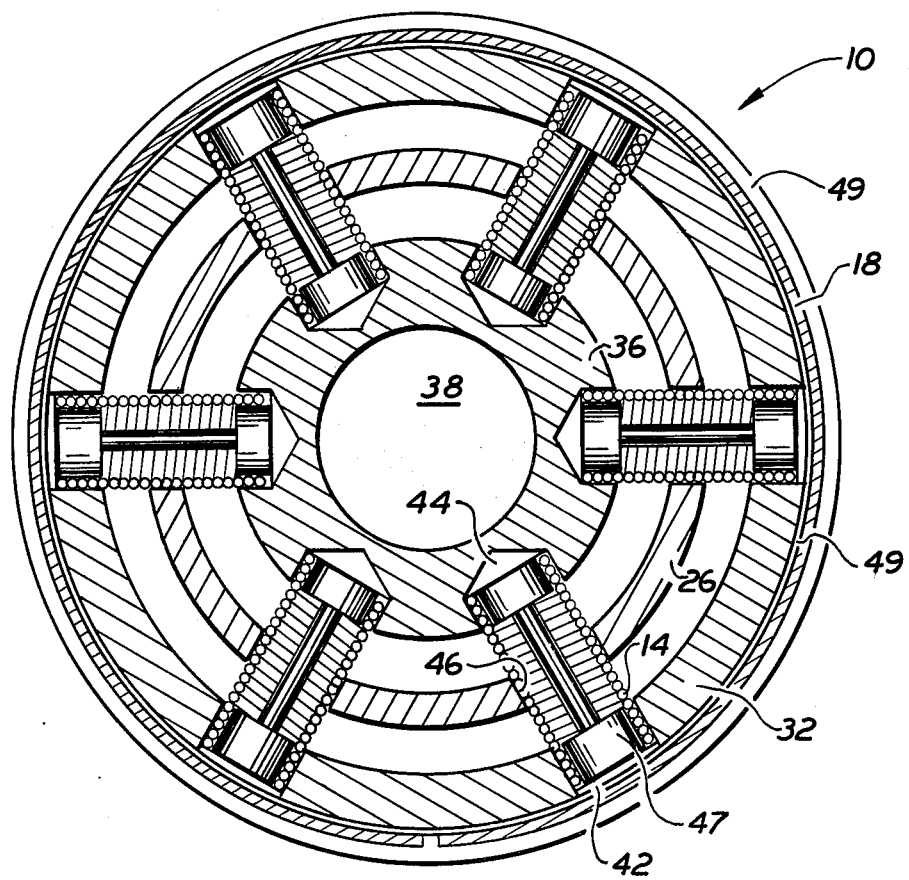
FIG. 3 is a cross-sectional view along line 3—3 in FIG. 1.

Referring to FIGS. 1, 2 and 3, a damper assembly 10 is shown comprising an inertial weight 12, at least three close-wound helical coil springs 14, and a suspension body 15 comprising a bottom clamp part 16, a spring retaining ring 18, and an upper clamp part 20. The damper 10 is shown clamped on overhead cable 22 by means of bolt 24 joining the upper clamp part 20 to bottom clamp part 16.

The inertial weight 12 is preferably an iron casting with a generally curved surface and having an annular rib 26 projecting upwardly near the outer periphery of the central circular planar surface 30. At least one small hole 27 at the level of 30 through a bottom portion of rib 26 is provided to permit drainage from the surface of any water that may accumulate on upper surface 30.

The bottom clamp part 16 comprises an annular skirt wall 32, a circular top wall 34 and a center cylinder 36 extending downward from the circular top wall 34 with a cylindrical depression 38 in its central portion. A longitudinal, semicircular trough 40 on top of the top circular wall 34 cooperates with upper clamp part 20 to suspend the damper 10 from conductor 22 when bolt 24 is tightened in assembly of upper clamp part 20 with bottom clamp part 16. At least three circular holes 42 extending through the skirt wall 32 are defined by portions of said skirt wall 32; in coaxial alignment with holes 42 are recesses 44 in and defined by portions of the side wall of the center cylinder 36.

The close-wound helical coil springs 14 are shown with one end of each spring contained within recess 44 in the center cylinder 36 and the other end of each spring contained within hole 42 in the annular skirt wall 32. The springs 14 pass through holes 46 in the annular rib 26 of the inertial weight 12. It can be seen that springs 14 disposed in the foregoing fashion provide support for the suspended inertial weight 12, and that the inertial weight in a device of this invention can be supported and suspended with as few as three springs.

Assembly of the damper is easily accomplished; springs 14 are simply pushed through the holes 42 in the annular skirt wall 32 in the bottom clamp part 16, then through holes 46 in the annular rib 26 of the inertial weight 12 and into recesses 44 in the center cylinder 36 in the bottom clamp part 16. All of the aforementioned holes are of the proper diameter to accommodate a fit with the damping springs 14. The equi-distant radial spacing of the damping springs 14 in combination with the fit of said springs in the aforementioned holes and recesses provides automatic centering of the inertial weight 12 upon assembly. It may be noted that this simple assembly feature eliminates the need for accessory assembly and positioning pieces such as the pins, rivets and open wound springs required to assemble the device disclosed in Hawkins et al U.S. Pat. No. 4,110,553 and thus provides a saving in material costs.

Even though the objects of this invention may be accomplished without the use of pins or bolts, assembly pins 47 are shown in FIG. 1 as components of the device; the pins 47 are installed when severe galloping or heavy ice accumulation may be a problem. Pins 47 are inserted into each spring, and each pin has enlarged portions at the ends thereof which help secure the holes 42 and recesses 44. The pin has no functional effect on the damping performance of the invention but may be used when unusually heavy loads or adverse conditions dictate a higher strength suspension means than the springs 14 alone would provide.

After positioning the helical springs 14 in the manner described above, a flexible elastomer tubular collar 49 may be slipped over the bottom clamp part 16 so that the upper portion of collar 49 is in tight contact with the outer peripheral surface of the annular skirt wall 32.

The bottom portion of the elastomer collar 49 is in tight contact with an upper portion of the inertial weight 12, and thus the collar provides a seal between the bottom clamp part 16 and the inertial weight 12 and protects the damping springs 14 against the harmful effects of an adverse environment.

The collar 49 in FIG. 1 is shown as a thin membrane. By making the collar from an elastomer material having a high damping coefficient, the collar functions not only as a seal but provides viscoelastic damping as well by flexing. In addition, the collar 49 may be made to include a circumferential bellows feataure (not shown) across the space separating the peripheries of the bottom clamp part 16 and the inertial weight 12 if less restraint on the movement of the inertial weight 12 is desirable.

With the flexible collar 49 in place, the spring retaining ring 18 is slipped downward from the top of the bottom clamp part 16 with interior surface of said ring 18 in tight contact with the outer surface of the flexible collar 49. The retaining ring 18 is supported by an annular, hemispherically shaped shoulder 48 projecting outwardly from the bottommost portion of the outer surface of the annular skirt wall 32. The retaining ring 18, thus positioned, functions to not only prevent the flexible collar 49 from separating from the bottom clamp part 16 and protect the upper portion of the collar 49, but also functions to prevent the springs 14 from dislodging.

The flexible elastomer collar 49 may be omitted where adverse environmental effects are not a concern. If the collar 49 is omitted, the retaining ring 18, slipped directly over the bottom clamp part 16, functions to prevent the springs 14 from dislodging and in combination with the upper clamp part 16 provides protection from the weather that will usually be adequate.

Damping of conductor aeolian vibration by utilizing a device of this invention in the preferred embodiment described above is accomplished by dissipating the vibration energy through the heat generated from mechanical friction between the coils of the close-wound damping springs 14 in response to the aeolian vibration. In an appropriate design, the spring mass (the inertial weight 12) must be related to the mass of the conductor between the location of the damper and the location at which the conductor is fixed (on the tower), and the natural frequency of the damper must be below the lowest frequency of vibration of the conductor that is to be expected. When the foregoing design criteria are met, the spring mass tends to remain fixed in space while any vibration of the conductor will flex the damper springs 14 transversely of their axes, the friction of the intercoil movement dissipating vibration energy so that the amplitude of vibration of the conductor is reduced to a harmless level. As may be appreciated, the material from which the springs are made, dimensions of the spring, the number of springs used, and the initial tension of each spring may be varied to give the desired spring constants and degree of frictional loss. In addition, it was determined by a number of experiments that the use of square wire rather than round wire offered advantages. Tests of springs with a low initial tension disclosed that the wear resistance of thosesprings wound with square wire was up to one hundred times better than springs wound with round wire. Because of the increased bearing surface of the square wire spring, the frictional damping was also increased.

The initial tension of a spring is that force with which the individual turns of a closed helical spring press against each other when the spring is subject to no loads. Testing of spring friction damping devices has demonstrated that springs of low initial tension increased the wear life of the springs over higher tension springs, and it is desirable therefore that the damping springs be made with as low an initial tension as possible to perform their function. As has been explained, the damping springs 14 in a device of this invention provide support for the inertial weight 12 as well as function as damping members. The damping springs 14 must be of sufficient strength and stiffness to support the inertial weight 12 with a minimum deflection since the intercoil contact area of the spring is the energy-dissipation area and the greater the deflection of the spring, the less is the contact area between adjacent coils. The unique, radial disposition of a plurality of small springs 14 of this invention distributes the load of the suspended weight 12 uniformly, and each spring carries only a small portion of the total load imposed by the weight 12. Cosequently, the smaller springs 14 employed in a device of this invention can be wound with less initial tension, for example, than the larger and lesser in number springs of a device under Hawkins et al U.S. Pat. No. 4,110,553. For comparable damping devices, the difference in required initial tension is 0.3 pounds versus four pounds. As well as requiring less initial tension, a further advantage of the device of the present invention is that less material is required for small springs 14 than is required for the springs of a comparable device under the aforesaid Hawkins et al patent. The savings are rather substantial; a difference of 0.189 pounds versus 0.0679 pounds of spring material, as an example.

Figure 7:
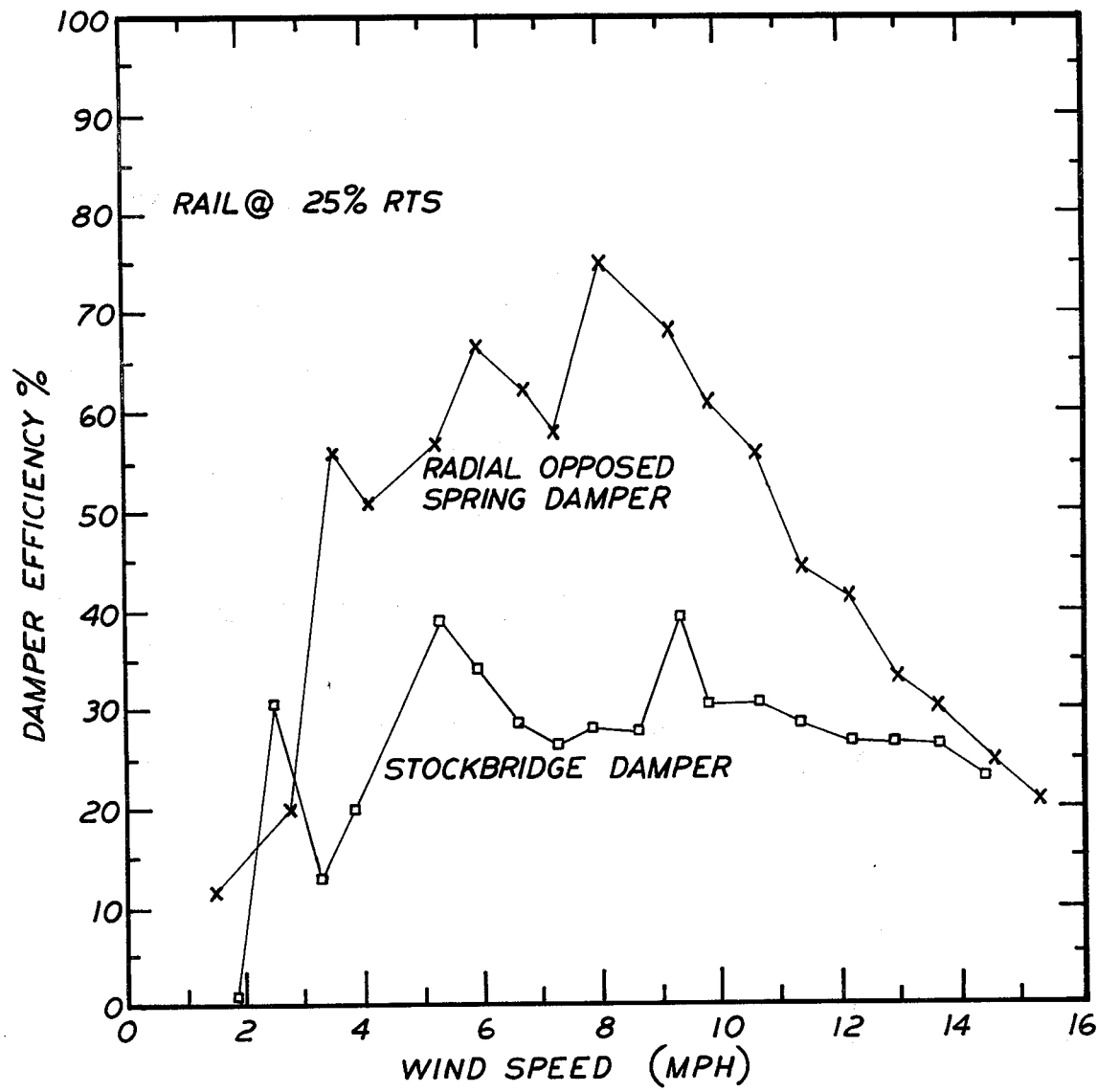
FIG. 7 is a graph showing comparative efficiencies of a device of this invention and a conventional Stockbridge damper.

As previously noted, an advantage of a device of this invention is improved damping efficiencies. FIG. 7 shows comparative results obtained from damping tests performed on a conventional Stockbridge damper and a radial opposed spring damper of this invention. The tests were made on a common ACSR conductor (Rail, 1.165 inches dia.) that was suspended at a standard installation tension of 25% of the rated conductor tensile strength. Thus suspended, the test installations were subjected to simulated wind speeds varying from approximately two miles per hour to approximately 15 miles per hour. Damper efficiency was then determined for particular wind speeds within the aforesaid range and plotted on the graph shown as FIG. 7. The damper efficiency of the radial opposed spring damper is clearly superior to that of the conventional Stockbridge damper, the most notable improvement being in the range of 3 miles per hour to 12 miles per hour. It is also notable that the radial spring damper tested in the foregoing experiment weighed only 6.15 pounds as compared to the Stockbridge damper weight of 14.56 pounds.

Figure 4:
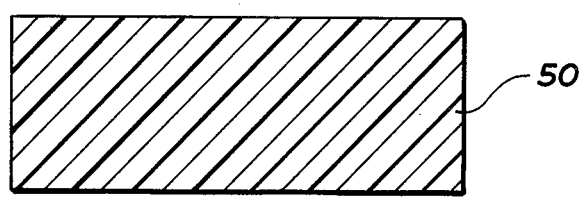
FIG. 4 is a cross-sectional longitudinal view of a solid cylindrical elastomer damping means.
Figure 5:
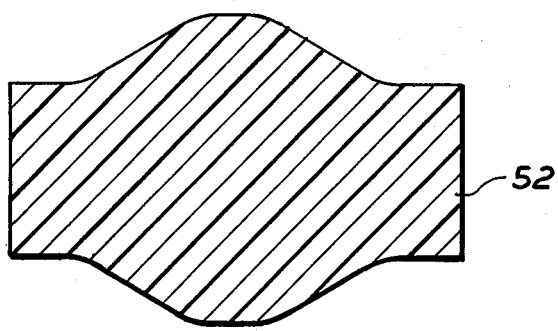
FIG. 5 is a cross-sectional longitudinal view of an alternate embodiment of a solid cylindrical elastomer damping means.
Figure 6:
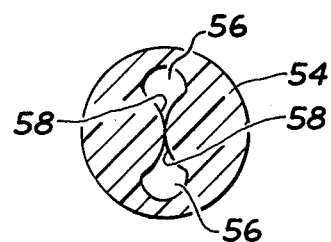
FIG. 6 is a transverse cross-sectional view of another alternate embodiment of a cylindrical elastomer damping means.

Another distinct advantage of a damping device of this invention is that elastomer shapes can be interchanged with close-wound radial springs as the damping means. Elastomer materials having high damping coefficients have inherent outstanding low frequency damping characteristics, and thus in a particular application a damping device using a damping means made from an elastomer may be more efficient. FIGS. 4, 5 and 6 show sectional views of a variety of elastomer shapes that may be used as a damping means in a device of this invention to satisfy different damping requirements. FIG. 4 shows a longitudinal section through a solid elastomer cylinder 50 having a length and diameter of appropriate dimensions to cooperate in assembly with the bottom clamp part 16 and inertial weight 12. FIG. 5 shows a longitudinal section through a solid elastomer cylinder 52 having a varying diameter with the maximum diameter occurring at the middle of the long dimension of the cylinder 52. An elastomer shape with this configuration would provide better high frequency damping characteristics than the shape shown in FIG. 4. The length and diameters of this shape and diameters of holes 42, 44 and 46 (FIGS. 1 and 3) are sufficient to permit assembly of the shape 52 with the bottom clamp part 16 and inertial weight 12. FIG. 6 is a transverse cross-sectional view of an elastomer cylinder 54 having void portions 56 extending the length of the cylinder. Opposing inner surfaces 58 of the cylinder are in physical contact. The length and diameter of this cylinder 54 are appropriate for assembly with the bottom clamp part 16 and inertial weight 12. Damping from a shape with a configuration of this kind occurs as a result of a combination of viscoelastic damping and frictional damping from the opposing inner surfaces 58 rubbing against each other as a result of the movement of the suspended inertial weight 12.

The method of assembling the elastomer shapes shown in FIGS. 4, 5 and 6 with the bottom clamp part 16 and the inertial weight 12 is the same method as has previously been described in assembling close-wound radial springs 14 with the bottom clamp part 16 and the inertial weight 12.

It is obvious that an unlimited number of shapes of elastomer materials could be used as a damping means in a device of this invention. The shapes shown in FIGS. 4, 5 and 6 are shown as examples to indicate the variations possible to dampen vibrations over a broad range of frequency when using a device of this invention. It is to be noted that an elastomer material can also be used in making a close-wound helical spring to provide a combination of friction and viscoelastic damping.

A device of this invention provides for a simple procedure to tuning the amount of damping required for a particular conductor at a certain site. The amount of energy that needs to be dissipated is a variable of the conductor weight and tension, and the greater the energy that must be dissipated, the greater the damping that must be included in the damping device. If springs are to be used as the damping means, the amount of damping can be controlled by (1) varying the number of springs, (2) varying the initial tension on the spring, (3) varying the wire diameter, (4) varying the material from which the wire is made, or (5) using springs made from square wire which creates more spring area for friction. If elastomer shapes are used as the damping means, the amount of damping can be varied in a similar fashion. It is an advantage of a device of this invention that a combination of elastomer and wound spring damper means can be used to broaden the efficiency of the damper over a wide range of frequencies. For example, three springs could be grouped in one-half of the damper, and three elastomer shapes in the other half. The effect of a combination of damping means of this kind would be to induce a rocking motion on the device when subject to aeolian vibration and provide an improvement in low frequency damping response.

It can be seen that the simplicity of assembly, interchangeability of damping means, and the self-centering feature of the inertial weight of a device of this invention provide a damping device with many distinct advantages over damping devices previously disclosed.

Having thus described my invention, I claim:

1. A device for damping aeolian vibration of a single overhead conductor comprising:
   a suspension body having means for clamping the device to a conductor;
   at least three separate resilient damping members equally and radially spaced about a vertical axis through said device;
   means connecting opposite ends of said resilient damping members to the suspension body; and
   an inertial weight suspended from the damping members.

2. The device of claim 1 wherein the resilient damping members are close-wound helical springs.

3. The device of claim 1 wherein the resilient damping members are solid elastomer cylinders.

4. The device of claim 1 wherein the damping members are elastomer cylinders having one or more longitudinal voids formed by portions of said cylinders.

5. The device of claim 1 in which the suspension body comprises an upper clamping portion and a lower clamping portion comprising a cylinder having a solid upper end wall; an annular skirt wall depending downward from the peripheral edge of the end wall, portions of the skirt wall defining equally spaced holes therethrough for the purpose of respectively inserting the resilient damping members through the said skirt wall and providing connecting means for one end of each resilient damping member; an inner cylinder depending downward from a central portion of the upper end wall, said inner cylinder having equally spaced recesses therein in coaxial alignment with the equally spaced holes in the annular skirt wall, said recesses in the inner cylinder respectively receiving the other end of each damping member and providing connecting means for the other ends of the resilient damping members.

6. The device of claim 1 wherein the inertial weight comprises a body having an upper surfaces; an annular rib projecting upward from the peripheral edge of said upper surface, said rib having equally spaced holes therethrough; with the resilient damping members located in and extending through said holes; said weight having a depending downward body portion below the upper surface, said depending body portion having a generally curved surface for the purpose of avoiding corona discharge when the damper is disposed on high voltage conductors.

7. The device of claim 1 in which a flexible, tubular collar is in tight contact with the suspension body and the inertial weight for the purposes of protecting the damping means from effects of the environment.

* * * * *